US008111583B2

(12) United States Patent
Schwartz

(10) Patent No.: US 8,111,583 B2
(45) Date of Patent: Feb. 7, 2012

(54) METHOD AND APPARATUS FOR DETERMINING AND INDICATING DIRECTION AND TYPE OF SOUND

(76) Inventor: Adam L. Schwartz, San Carlos, CA (US)

( * ) Notice: Subject to any disclaimer, the term of this patent is extended or adjusted under 35 U.S.C. 154(b) by 1204 days.

(21) Appl. No.: 11/894,447

(22) Filed: Aug. 21, 2007

(65) Prior Publication Data

US 2009/0052687 A1 Feb. 26, 2009

(51) Int. Cl.
*G01S 3/80* (2006.01)
*H04R 3/00* (2006.01)

(52) U.S. Cl. ........................... 367/127; 367/123; 381/92

(58) Field of Classification Search ............. 381/17–18, 381/92; 367/123, 127
See application file for complete search history.

(56) References Cited

U.S. PATENT DOCUMENTS 3,859,621 A * 1/1975 Foreman ....................... 367/127
5,465,302 A * 11/1995 Lazzari et al. .................. 381/92
6,266,014 B1 7/2001 Fattouche et al.
6,912,178 B2 * 6/2005 Chu et al. ...................... 367/123
7,117,149 B1 10/2006 Zakarauskas
7,162,043 B2 1/2007 Sugiyama et al.
2002/0181723 A1 * 12/2002 Kataoka .......................... 381/92
2005/0078833 A1 * 4/2005 Hess et al. ...................... 381/26
2005/0207591 A1 * 9/2005 Tsuji et al. ...................... 381/92
2007/0025562 A1 * 2/2007 Zalewski et al. ................ 381/92

OTHER PUBLICATIONS

Brandstein and Silverman, A Practice and Methodology for Speech Localization and Microphone Arrays, Nov. 13, 1996, Technical Report, Brown University.
Rui and Florencio, New Direct Approach to Robust Sound Source Localization, Jan. 13, 2003, Technical Report MSR-TR-2003,02, Microsoft.
Birchfield and Gillmore, Acoustic Source Direction by Hemisphere Sampling, May 2001, ICASSP.

* cited by examiner

*Primary Examiner* — Devona Faulk
*Assistant Examiner* — George Monikang

(57) ABSTRACT

A method and apparatus for determining the direction of a sound source is disclosed. The method includes determining time differences of arrival of the sound at N locations and using the differences to determine the angular direction of the source. The apparatus indicates the angle of arrival and additionally indicates the type of the sound source.

18 Claims, 9 Drawing Sheets

METHOD AND APPARATUS FOR DETERMINING AND INDICATING DIRECTION AND TYPE OF SOUND

FIELD OF INVENTION

This invention relates to angle of arrival and source direction determination and identification.

BACKGROUND OF INVENTION

Driving an automobile is a dangerous endeavor. In the United States alone, there were approximately 6.4 million auto accidents in 2005 resulting in $230 billion of damage, 2.9 million injuries and 42,636 deaths. Safe driving requires skill and the ability to detect and avoid dangerous situations. The detection aspect requires visual and auditory acuity. Interestingly, a minimum vision requirement is needed to obtain a driver's license but there is no corresponding auditory requirement. This is reasonably since vision is clearly the more important of the two senses for driving and it would be unfair to deprive those with hearing impairments of a driver's license. Nonetheless, the ability to hear sirens, screeching tires, collisions and horns is clearly a benefit to safe driving. In fact, the inventor has interviewed a handful of legally deaf drivers who have expressed that driving can be frightening without the ability to hear oncoming sounds.

In the United States alone, there are as many 600,000 deaf people and 6,000,000 with hearing impairment. Thus, a fairly large group of drivers is lacking full sensory perception needed for safe driving. Some may not even be willing to drive because of their hearing impairment. The present invention is intended to provide compensation for this deficit by creating a visual indication of what would otherwise be audibly detected. Specifically, through use of microphones and signal processing algorithms, an embodiment of the present invention will detect sounds, determine the direction of the sound source and visually indicate that direction. Additionally, an embodiment can also indicate the type of sound that has been detected.

SUMMARY OF INVENTION

Direction of arrival technology is well-known in the art. Radar systems, and more recently cellular direction finding systems, have used various methods such as TDOA (time difference of arrival), monopulse, triangulation and other methods, to locate the direction, or actual location, of a signal source. These systems determine location based on measurements of radio signals. These techniques have also been adopted for sound source location. In most applications, accuracy is the paramount requirement.

The disclosed embodiments of the present invention provide sound direction information in a visual form that can, for instance, be used to assist the hearing impaired while driving in an automobile. Although it is possible to achieve high accuracy with the approach discussed herein, accuracy is not the primary goal. Instead, a rough idea of the source direction is sufficient and this can be achieved with a simplification of the general approach. Thus, one aspect of the described embodiments is oriented towards a simple implementation.

The described embodiments are composed of a detection mechanism and a display mechanism. The detection mechanism uses a microphone array to sample sound over a spatial area. In one embodiment, time differences of arrivals of the sound to the various microphones are computed. From the time differences, the angle of arrival is determined.

Many existing methods for sound location determination are based on pairs of microphones oriented with a common origin. The time differences between the pairs of microphones give rise to a simultaneous set of equations which can be solved for the source location. Typically, least-squares is use to obtain a solution. Some approaches suffer the defect of having "blind spots". One embodiment of the method described herein also uses time-differences but accomplishes the desired results with three microphones equally spaced around a unit circle with high accuracy and low implementation complexity. The method can use more microphones for increased accuracy (or only two microphones if localizing the sound source to one of two half-planes is sufficient). The novel solution is given in closed-form and does not have blind spots. A simplified, less precise, implementation is also developed.

Another embodiment specifically applies sound direction determination for use in an automobile to provide a visual indication to the driver of the sound direction.

Another purpose of the described embodiments is to provide an indication of the type of sound. For instance, the device might indicate, through a visual icon, that the sound was produce by screeching tires, a horn or a siren.

DETAILED DESCRIPTION

An apparatus which can detect sounds and provide a visual indication of the direction of a sound source is highly useful for hearing impaired drivers. Even for non-hearing impaired drivers, such a product could be highly useful if sounds outside the car are hard to detect inside the car. Very little in the way of products are available to assist the hearing impaired drive. An example of one product is called the AutoMinder. The AutoMinder monitors your vehicle's built-in sound warning systems (such as low fuel, fasten seat belt, door ajar, etc.) It warns you with a loud tone and a flashing light when these warning systems go off.

Figure 1:
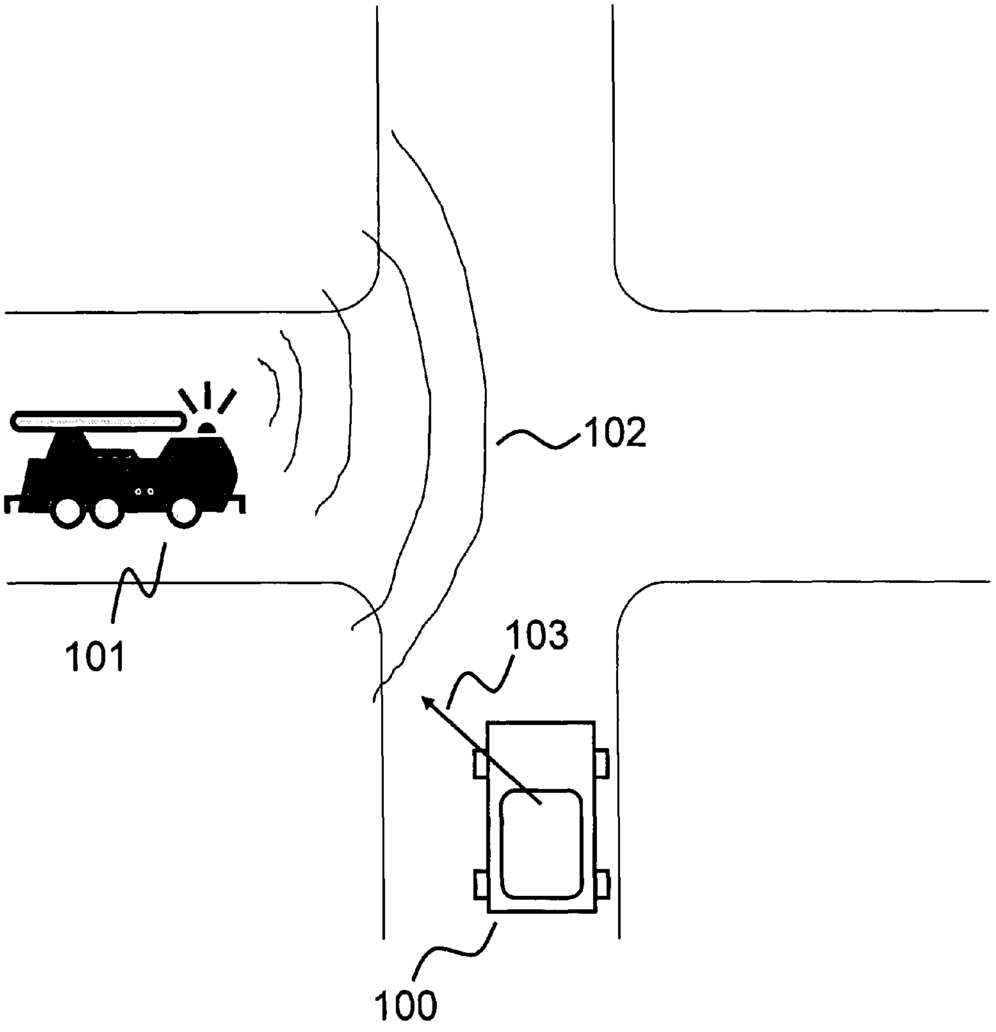
FIG. 1. Shows an example of a situation in which it is useful to be able to determine the direction of a sound source. In this case, the sound source is the siren of a fire truck.

The apparatus should be able to distinguish, and ignore, sounds at the ambient sound level. Having the additional ability to recognize and indicate the type of sound (siren, screeching tires, horn, collision, etc . . . ) is also desirable. An example of a situation in which such an apparatus would be useful is depicted in FIG. 1. A car (100) approaches an intersection from one direction and a fire truck (101) approaches from another direction with siren blaring. The siren emits a sound wave, s(t), indicated by a propagating wave front (102). The apparatus determines, and provides a visual indication of, the direction (103) of the siren.

More generally, an embodiment includes a plurality of separately located microphones attached to an automobile for receiving sound from a sound source. A processor receives signals generated from the microphones that are electronic representations of the sound. The processor determines time difference of arrival of that sound between pairs of the microphones. From the time differences, the direction of the sound source is determined. A display controllable by the processor is used to provide a visual indication of the direction of the sound source.

There are many methods to determine angle of arrival. Possibly the simplest approach is to use relative sound levels: the microphone receiving the highest sound level would indicate the direction of the sound. The two problems with this approach are that you need as many microphones as directions you wish to be able to indicate and any kind of sound reflections (reverb) and path-dependent attenuation will cause accuracy to degrade significantly. Using directional microphones can help to some extent.

A much more reliable approach is to measure the time difference of arrival at different microphones. In one embodiment of the invention, three microphones are equally spaced around a circle (that is, they are separated by 120°). A simple closed-form solution for the angle of arrival based on the time differences is herewith derived based on one approximation. It will be clear that this configuration is used for simplicity of implementation but that other configurations using a different number of microphones or a different arrangement of microphones do not alter the nature of the invention.

Figure 2:
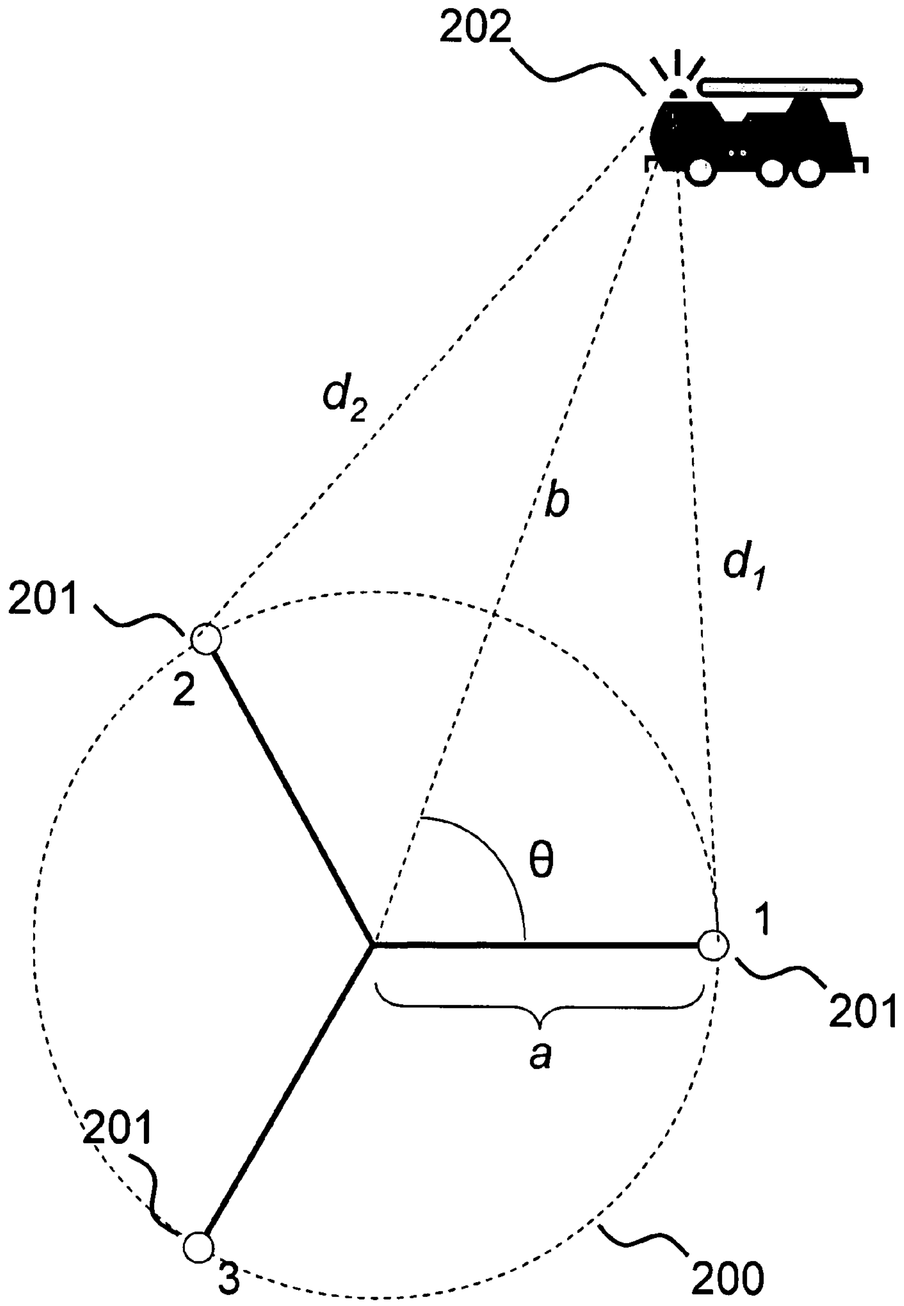
FIG. 2. A diagram showing three microphones spaced equally around a circle and a source of sound located at angle $\theta$.

FIG. 2 shows an embodiment of the microphone portion of the invention (200). For this embodiment, there are three microphones (201), labeled 1, 2 and 3, spaced equally around a circle of radius a. There is a sound emitted from a distant source (202) which arrives at the microphones with angle of $\theta$. The angle $\theta=0$ is arbitrarily assigned to the angle of microphone 1. Later the substitution $\psi_1=\theta-\pi/3$, or $\psi_2=\theta-\pi$, or $\psi_3=\theta+\pi/3$ will be used to provide an equivalent, but simpler, formulae. The source is a distance of b from the center of the microphone array. Letting $d_i$ represent the distance between the source and microphone i, a simple application of the law of cosines provides $$d_i^2=a^2+b^2-2ab\cos(\phi_i-\theta),\ i=1,2,3$$

where $\phi_1=0$, $\phi_2=\frac{2}{3}\pi$ and $\phi_3=-\frac{2}{3}\pi$. Note that the difference in distance are given by $$\delta_{ij}\equiv d_i^2-d_j^2=2ab(\cos(\phi_j-\theta)-\cos(\phi_i-\theta)).$$

These distances can be determined based on time differences between the various microphones of the arrival of the sound. This will be discussed later.

More useful than the individual differences, $\delta_{ij}$, are the ratio of these differences:

$$\Delta_{kl}^{ij}\equiv\frac{\delta_{ij}}{\delta_{kl}}=\frac{\cos(\phi_j-\theta)-\cos(\phi_i-\theta)}{\cos(\phi_l-\theta)-\cos(\phi_k-\theta)}.$$

Note that these ratios do not depend on the unknown quantities a and b. The only remaining unknown is $\theta$. Before making the variable substitution indicate above a solution is provided for the sake of completeness:

$$\theta=\tan^{-1}\left(\frac{\sqrt{3}\,(1-\Delta_{ik}^{ij})}{1+\Delta_{ik}^{ij}}\right)+\phi_i\quad i,j,k=1,2,3\quad i\neq j\neq k.$$

When implementing this formulation with finite-precision arithmetic, it is important to take steps to keep the argument of the inverse tangent as close to zero as possible to maintain procession. Doing so requires careful choice of the i, j and k indices based on the $\delta_{ij}$ quantities. There are several strategies that work. The easiest approach is to choose i to correspond to the microphone closest to the sound source as determined by which microphone receives the signal first. However, this determination can be difficult in a realistic environment with reverb and noise. One can also determine i based on examination of the set of $\{\delta ij\}$.

Instead of pursuing this further, a simpler implementation is achieved by making the angle substitutions $\psi_1=\theta-\pi/3$, or $\psi_2=\theta-\pi$, or $\psi_3=\theta+\pi/3$. Making this substitution into the equations for $\Delta_{kl}^{ij}$, solving for $\psi$ and then converting back to $\theta$ results in the simpler expression:

$$\theta=\pm\tan^{-1}\left(\frac{-\sqrt{3}\,\Delta_{jk}^{ij}}{2+\Delta_{jk}^{ij}}\right)+\rho_{ijk}\quad i,j,k=1,2,3\quad i\neq j\neq k$$

where the ± depends in a simple way on j and k and $$\rho_{ijk}=\begin{cases}\pi/3\text{ or }-2\pi/3 & \text{for } i=1\\ \pi\text{ or }0 & \text{for } i=2\\ -\pi/3\text{ or }2\pi/3 & \text{for } i=3\end{cases}$$

where the choice of the first or second rotation depends on the sign of $\delta_{ik}$ (or, equivalently, on the sign of $\delta_{ij}$). As a specific example, if $|\delta_{12}|<|\delta_{23}|<|\delta_{31}|$, then $$\theta=\tan^{-1}\left(\frac{-\sqrt{3}\,\Delta_{23}^{12}}{2+\Delta_{23}^{12}}\right)+\begin{cases}+\frac{\pi}{3} & \text{if } \delta_{13}<0\\ -\frac{2\pi}{3} & \text{if } \delta_{13}\geq 0\end{cases}.$$

The benefit of this formulation is that it is straightforward to choose the indices i,j,k to keep the argument of the arc tangent between −0.5 and 0.5. Thus, the argument is kept in the sweet spot of the arc tangent and finite-precision arithmetic can give very accurate results.

Figure 3:
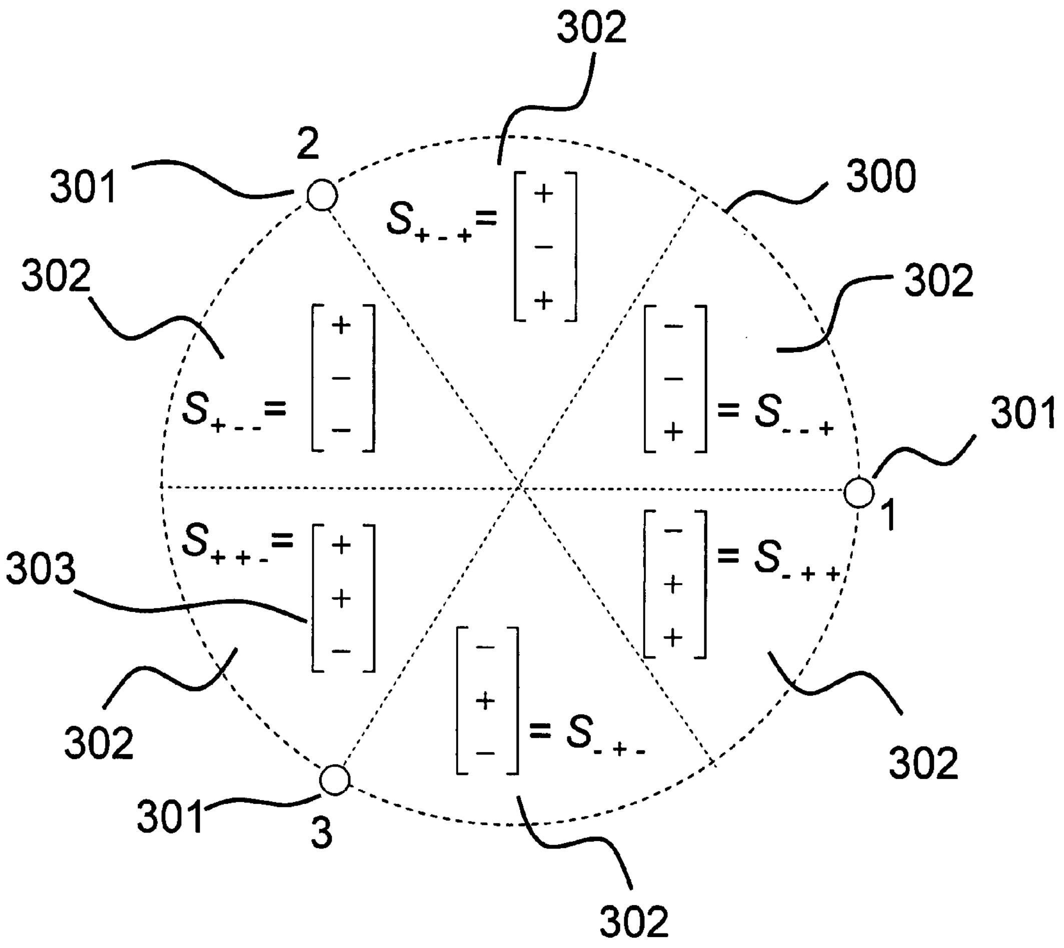
FIG. 3. The 60° sector corresponding to the direction of arrival can be determined just by the sign of the time difference of arrivals between the three microphones.

If high accuracy in the determination of $\theta$ is not needed, the above equation can be greatly simplified. If it is sufficient to indicate from which of six equally spaced 60° sectors the sound originated from, then the signs of the differences $\delta_{ij}$ provide enough information. This is shown in FIG. 3. Again, the three microphones are equally spaced along a circle (300). Based on the placement of the microphones (301), the circle is divide into six equally space 60° sectors (302). It can be determined from the sign vector $$S = \begin{bmatrix} \text{sign}(\delta_{12}) \\ \text{sign}(\delta_{23}) \\ \text{sign}(\delta_{31}) \end{bmatrix}$$

which of the six sectors the sound originated. Each of the six possible values of S (303) corresponds to one of the six sectors. Determining the location of the sound source to one of a set of different regions, or sectors, is referred to as localizing the sound source. For example, in this case of three microphones, the sound source location can be localized to one of six sectors as shown in FIG. 3.

Figure 4A:
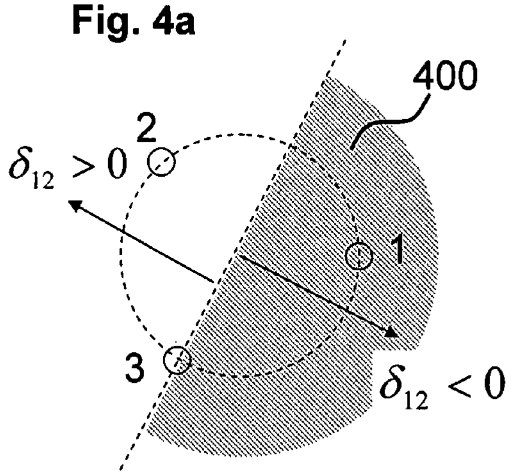
FIG. 4. Shows how the sound source direction is localized to one of six sectors by the intersection of three half-planes defined by the relative arrival time of the sound between each pairing of microphones.

Notice that the three signs of S encode the order in which the sound was received at the microphones. For instance, the sign vector $$S = S_{--+} = \begin{bmatrix} - \\ - \\ + \end{bmatrix}$$

indicates that the sound arrived first at microphone 1, then microphone 2 and finally at microphone 3. Each quantity $\delta_{ij}>0$ thus defines the half-plane containing microphone j while $\delta_{ij}<0$ defines the other half-plane containing microphone i. For each pairing of microphones, the associated half-planes divide space mid-way between the microphones perpendicular to the line connecting the microphones. For example, FIG. 4*a* shows the half-planes dividing microphones 1 and 2 with the shaded region (400) indicating the half-plane which contains microphone 1. If $\delta_{ij}>0$ then the sound source is located in the half-plane containing microphone j and if $\delta_{ij}<0$ then the sound source is located in the half-plane containing microphone i.

Figure 4B:
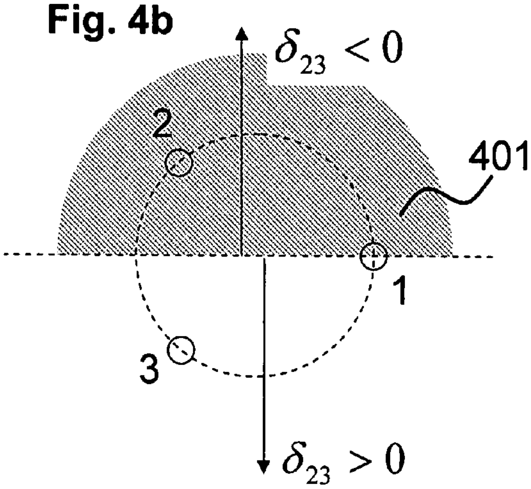
Figure 4C:
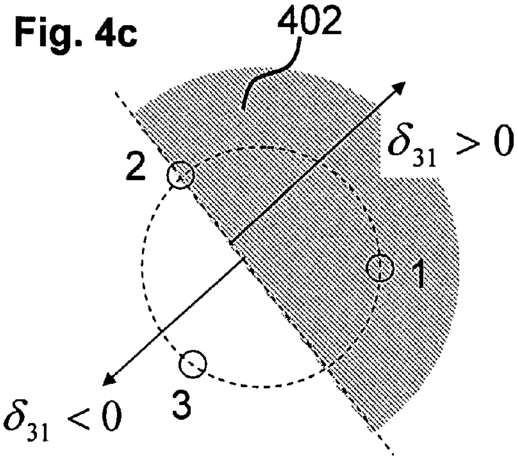
Figure 4D:
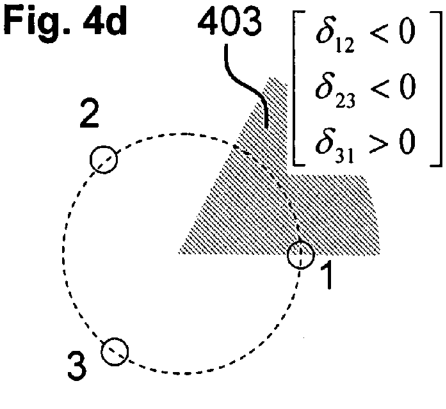

The intersection of the half-planes defined by the sign vector localizes the sound source. This is depicted in FIGS. 4*a*-4*d*. FIG. 4*a* shows the half-planes defined by the difference $\delta_{12}$ with the half-plane (400) corresponding to $\delta_{12}<0$ highlighted. Similarly, FIG. 4*b* shows the half-plane (401) corresponding to $\delta_{23}<0$ highlighted and FIG. 4*c* shows the half-plane (402) corresponding to $\delta_{31}>0$ highlighted. The intersection of these three half-planes localizes the sound to the sector (404) shown in FIG. 4*d*.

Figure 5:
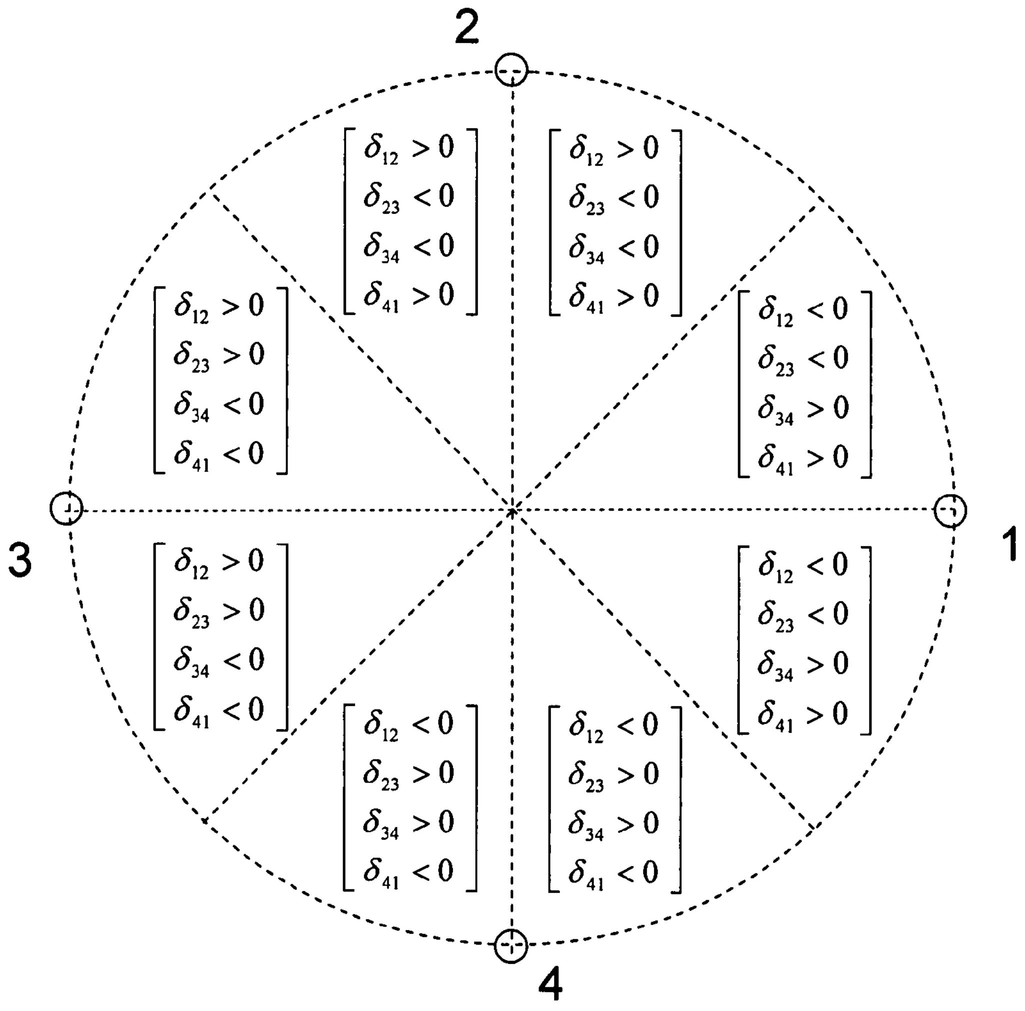
FIG. 5. Shows that the method of sound source localization can be generalized to higher accuracy using more than three microphones.

From this description, it should be clear that this sound localization technique can be generalized to N non-equally spaced microphones. Specifically, if there are N microphones, then the sound can be localized to one of 2N sectors (except in the case N=2 for which the sound can be localized to only one of two half-planes separating the microphones). The sectors are defined by the intersection of the half-planes separating the microphones. FIG. 5 shows an example with N=4. Note that it isn't necessary to use more than three microphones to achieve higher accuracy for determining the direction of the sound source. The formula for θ provided above provides excellent accuracy with only three microphones. The method described here of intersecting half-planes is provided for its simplicity and ease of implementation.

Finally, note that if different sets of indices are used to construct S then the signs will be different. However, the solution is unique. The present invention is, of course, not restricted to any particular choice of indices.

In the preceding development, it is assumed that differences $\delta_{ij}$ are known. We now show how to determine the $\delta_{ij}$ based on the time-difference of arrivals of the sound arriving at the microphones. Because of differences in the signal received at each microphone due to noise, reverb and amplitude variations, it is not accurate to simply try to time the arrival of s(t) at each microphone and compare the arrivals to form the time differences. Instead, it is known in the art that performing a cross-correlation of the signals $s_i(t)$, i=1, 2, 3, where $s_i(t)$ is the signal arriving at microphone i, yields accurate results. The signals arriving at the microphones are $$s_i(t)=h_i(t)*s(t-\tau_i)+n_i(t)\ i=1,2,3$$

where $h_i(t)$ is the channel between the sound source and microphone i, $n_i(t)$ is the ambient noise at microphone i and the $\tau_i$, i=1, 2, 3, represent the arrival time at microphone i of the sound s(t) from the sound source. Let $\zeta_{ij}\equiv(\tau_i-\tau_j)$ represent the time difference of arrivals between microphone pair i and j. Then, if c is the speed of sound, the difference in distance between the source and the microphones is $d_i-d_j=c\zeta_{ij}$. It remains to determine the time difference of arrivals $\zeta_{ij}$. The cross-correlation is defined as $$R_{ij}(\tau)=\int_T^T s_i(t)s_j(t-\tau)dt.$$

where T is a sufficient long interval to integrate most of the signal energy. An equivalent representation in the frequency-domain is $$R_{ij}(\tau)=F^{-1}\{\Psi_{ij}(f)S_i(f)S^*_j(f)\}$$

with Ψ(f)=1. The time-difference of arrivals is simply $$\zeta_{ij} = \underset{\tau}{\text{argmax}}|R_{ij}(\tau)|.$$

Various improvements on this formula are obtained by choosing a filter Ψ(f) other than unity. Some common choices include $$PHAT:\quad \Psi_{ij}(f) = \frac{1}{|S_i(f)||S_j(f)|}$$

$$ML:\quad \Psi_{ij}(f) = \frac{|S_i(f)||S_j(f)|}{|N_j(f)|^2|S_i(f)|^2 + |N_i(f)|^2|_j(f)|^2}$$

where $N_i(f)$ is the Fourier transform of $n_i(t)$. PHAT is known as a whitening filter. It can be understood as flattening the magnitude of the spectrum which leads to a sharper impulse for $R_{ij}(\tau)$. The maximum-likelihood filter, ML, can be understood as giving more weight to frequencies which possess a higher signal-to-noise ratio. As a third example, a simple filter which can be applied separately to each $s_i(t)$, is $$\Psi_i(f) = \frac{1}{q|S_i(f)| + (1-q)|N_i(f)|}\quad q \in [0, 1].$$

The parameter, q, trades-off spectral whitening for noise filtering. A further simplification occurs if the signal and noise spectrums are similar at each microphone. Then, a single filter can be applied to each $s_i(t)$:

$$\Psi(f) = \frac{1}{q|S(f)| + (1-q)|N(f)|}\quad q \in [0, 1].$$

Note that the filter $\Psi(f)$ can either be applied in the frequency-domain or its inverse-Fourier transform, $\psi(t)$, can be convolved with the microphone signals in the time-domain. In other words, $$R_{ij}(\tau)=\int_T^T(\Psi(t)*s_i(t)(\Psi(t-\tau)*s_j(t-\tau)dt.$$

One advantage of this formulation is that it incorporates the possibility of match filtering to specific sound types. Specifically, rather than having a single filter, $\Psi(f)$, a bank of filters, $\Psi_j(f)$, j=1, . . . , J, can be applied where J is the number of different sound types being considered. Then, for each j the energy $$E_j=\int(\Psi_j(t)*s_i(t))dt$$

(for one or all of the microphones, i) can be computed and the type of sound can be inferred from the j that gives the maximum $E_j$. From the determination of the sound type, an icon which graphically presents the type of sound can be displayed. Alternatively, text can be used to state the type of sound.

Finally, note that the cross correlation of the time-differences leads to $d_i-d_j=c\zeta_{ij}$ (where c is the speed of sound). However, the quantity of interest used in the formulation above is $\delta_{ij}\equiv d_i^2-d_j^2$. At this point, the only approximation used in this derivation is introduced. If b>>a (that is, the distance to the sound source is much greater than the distance between the microphones) then $$\delta_{ij} = d_i^2 - d_j^2 = (d_i + d_j)(d_i - d_j) \cong 2bc\zeta_{ij}.$$

Hence, $$\Delta_{kl}^{ij} \cong \frac{\zeta_{ij}}{\zeta_{kl}}.$$

This approximation is quite benign. For instance, if b=10a then the maximum error in the determination of $\theta$ is only 1.4°.

Figure 6:
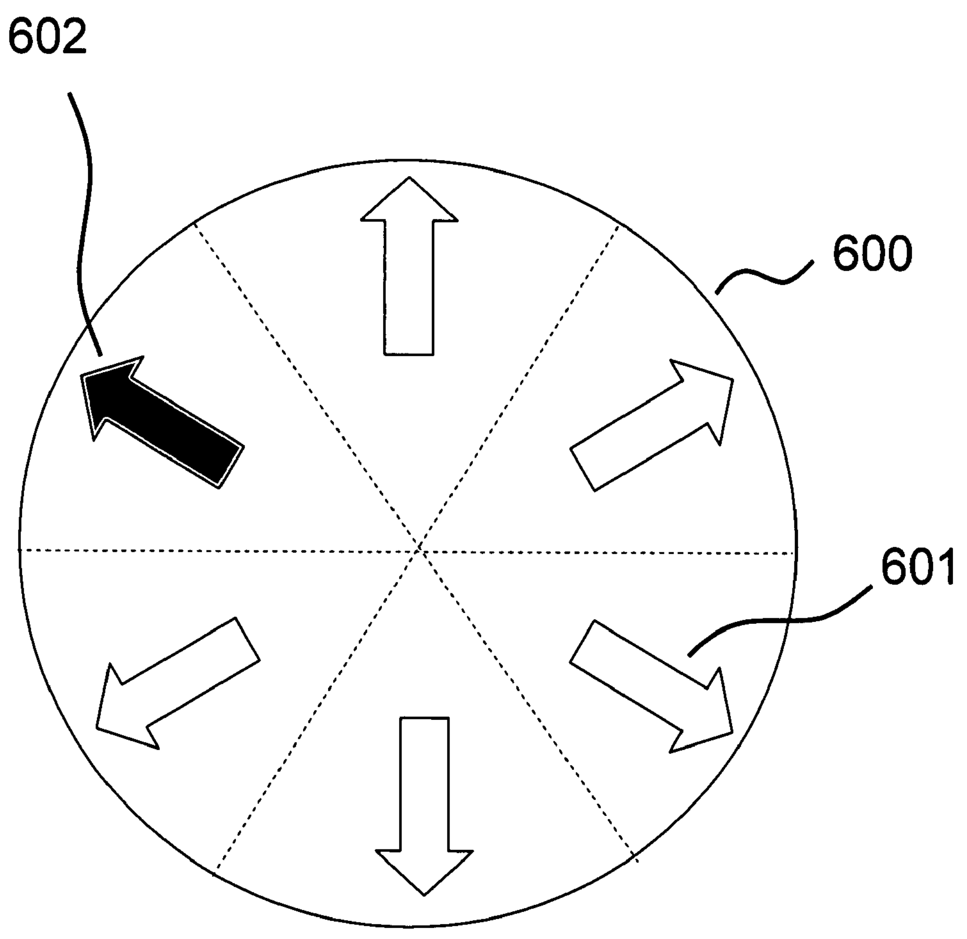
FIG. 6. A visual display which indicates the direction of the sound.

Once the direction of the sound source is determined, it is indicate visually. FIG. 6 shows an embodiment of such a visual display (600). The display has arrows (601) pointing in various directions. Preferably the arrows point in directions equally spaced by 60° about the circle. Once the angle of arrival is determined, the arrow corresponding to the sector containing the sound source is illuminated (602). Clearly, the invention is not limited to using arrows to display the direction and other forms of display are within the spirit of the invention.

Figure 7:
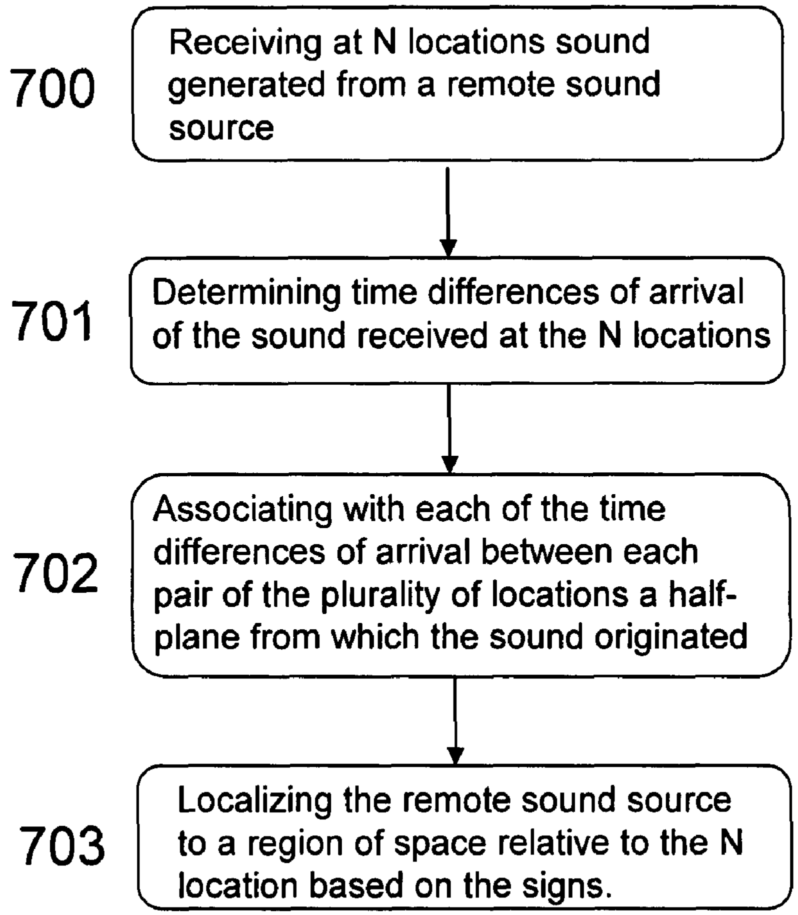
FIG. 7. A flowchart showing an example of steps of a method for sound location determination.

An embodiment of the invention proceeds as shown in FIG. 7. The method consists of (700) receiving at N locations sound generated from a remote source; (701) determining time differences of arrival of the sound received at the N locations; (702) associating with each of the time difference of arrival between each pair of the plurality of locations a half-plane from which the sound originated; and (703) determining the source direction as the intersection the half-planes.

Figure 8:
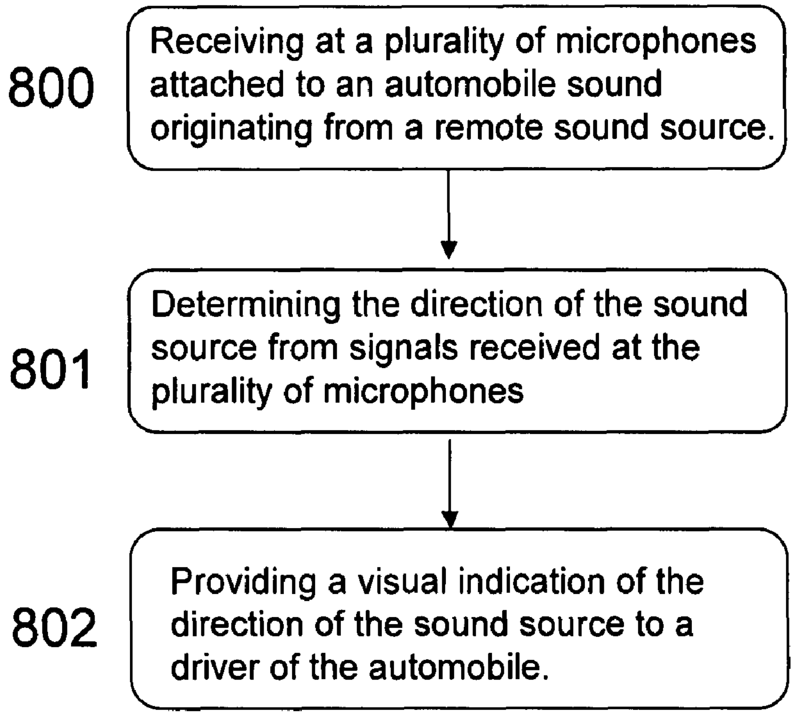
FIG. 8. A flowchart showing the main steps of an alternative embodiment of the invention.

An alternative embodiment is shown in FIG. 8 where the method consists of (800) receiving at a plurality of microphones attached to an automobile sound originating from a remote sound source; (801) determining the direction of the sound source from signals received at the plurality of microphones; and (802) providing a visual indication of the direction of the sound source to a driver of the automobile.

Figure 9:
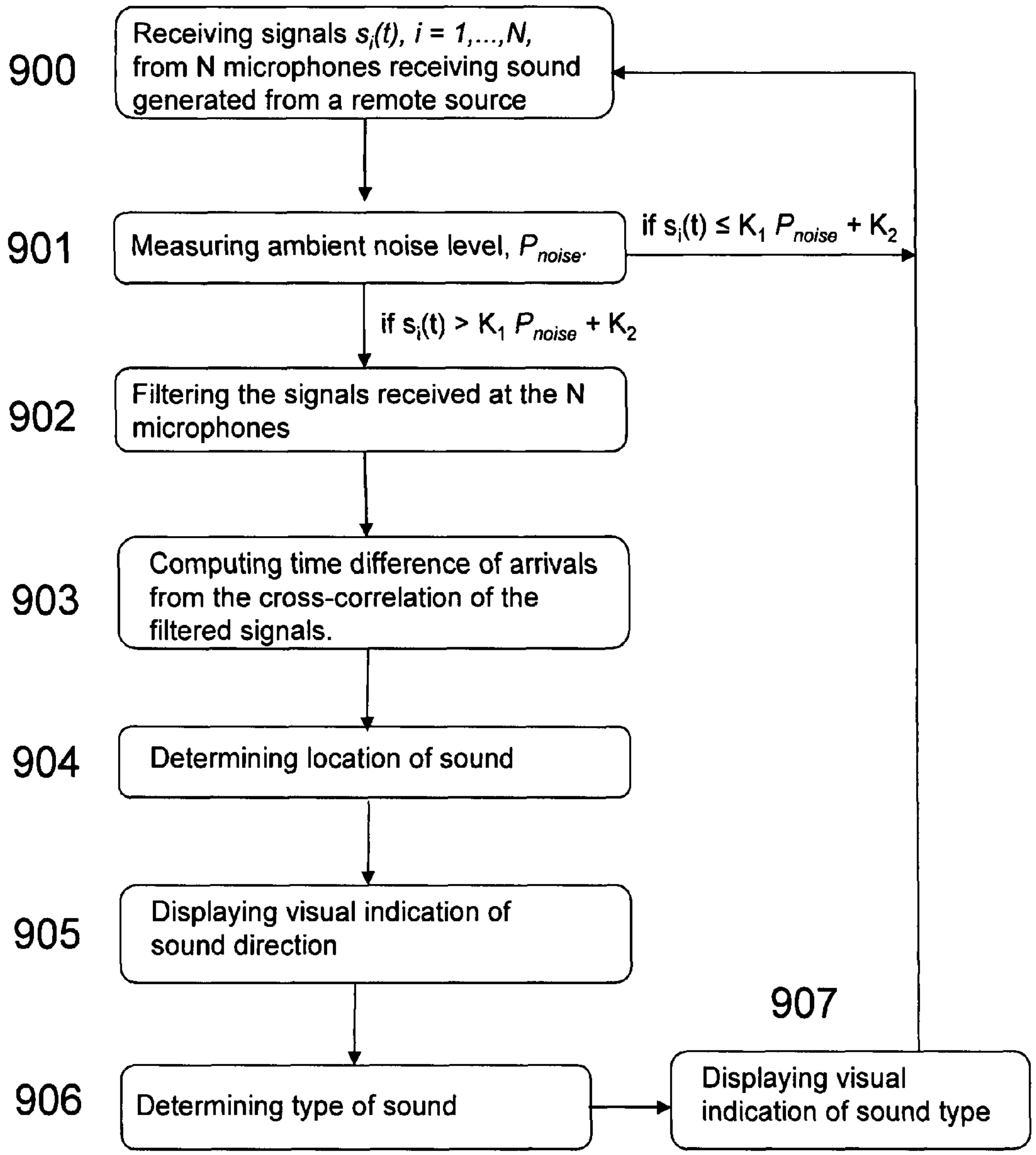
FIG. 9. A flowchart showing the steps of a third embodiment of the invention.

A third embodiment of the invention is shown in FIG. 9. Signals $s_i(t)$, i=1, . . . , N are received from the N microphones (900). The signals are electronic representations of the received sound. As the system runs, an ambient noise level substantially equal to $$P_{noise} = \frac{1}{T}\int_o^{o+T} |\psi(t) * n_i(t)|^2 dt,$$

is determined (901). If a signal is detected whose amplitude or energy exceeds a pre-determined (or adaptively determined) margin, the system applies filtering to the received signals (902). Time differences of arrivals are computed from the cross-correlation of the filtered signals (903). From the time difference, the direction of the sound is determined (904). A visual indication corresponding to the direction of the source is then provided (905). Optionally, the type of sound (which might include, for instance, the sounds of screeching tires, horns, sirens, or collisions) is determined (906) and visually indicated (907). After the sound ends, the system returns to state (900).

I claim:

1. A method of source direction determination a remote sound source, comprising:

a. receiving at a plurality of locations sound generated from the remote sound source;

b. determining time differences of arrival by determining differences in time between the sound received at each pair of the plurality of locations;

c. associating with each of the time differences of arrival between each pair of the plurality of locations a half-plane from which the sound originated;

d. determining the source direction by an intersection of the half-planes.

2. The method of claim 1 wherein associating with each of the time differences of arrival a half-plane from which the sound originated comprises:

a. assigning a positive sign to each time differences which is greater than zero and a negative sign to each time difference which is less than zero;

b. assigning the half-plane according to the signs.

3. The method of claim 1 wherein the sound is received by two microphones and the remote sound source direction is localized to one of two half-planes relative to the locations.

4. The method of claim 1 wherein the sound is received at more than two locations and the remote sound source direction is localized to one of a plurality of sectors, the plurality comprising at most twice a number of sectors as the number of locations, and the sectors being defined by the intersection of the half-planes.

5. The method of claim 4 in which each of the plurality of locations is spaced substantially equally around a circle.

6. The method of claim 1 further comprising displaying a direction of the remote sound source on a visual display.

7. The method of claim 1 wherein determining the time difference of arrival comprises:

a. filtering the sound received at each of the plurality of locations;

b. computing cross-correlation of the filtered sounds.

8. The method of claim 1 further comprising:

a. filtering the sound received at each of the plurality of locations, each filter corresponding to one of a set of sound types;

b. monitoring output of each of the plurality of filters;

c. selecting at least one of the set of sound types based on the monitored outputs;

d. displaying an indication of selected at least one of the set of sound types.

9. The method of claim 1, further comprising:

a. estimating an ambient noise level;

b. wherein determining the time differences of arrival is initiated when a signal level exceeds the ambient noise level by a margin.

10. A method of indicating a direction of a sound source relative to an automobile, comprising:

a. receiving, at a plurality of microphones attached to the automobile, sound originating from the sound source;

b. determining the direction of the sound source from signals received at the plurality of microphones;

c. providing a visual indication of the direction of the sound source to a driver of the automobile;

wherein determining the direction of the sound source comprises:

d. computing time differences of arrival of the signals received at the plurality of microphones;

e. associating with the time differences of arrival between each pair of the plurality of locations a half-plane separating the pair, with boundary perpendicular to the direction connecting the pair, from which the sound originated;

f. localizing the sound source to a region of space relative to the automobile based on an intersection of half-planes.

11. The method of claim 10 wherein the microphones are substantially equally spaced around a circle.

12. The method of claim 10 wherein computing the time differences of arrival comprises:

a. filtering the signals received by each microphone;

b. computing cross-correlation of the filtered signals.

13. The method of claim 10 further comprising:

a. filtering the sound received at each of the plurality of locations, each filter corresponding to one of a set of sound types;

b. monitoring output of each of the plurality of filters;

c. selecting at least one of the set of sound types based on the monitored outputs;

d. displaying an indication of selected at least one of the set of sound types.

14. The method of claim 10, further comprising:

a. estimating an ambient noise level;

b. wherein determining the direction of the sound is initiated when a signal level exceeds the ambient noise level by a margin.

15. The method of claim 10 in which the plurality of microphones consists of directional microphones pointing outwards and wherein the direction of the sound source is determined by which microphone receives the largest signal.

16. A system for determining a direction of a sound source relative to a automobile, comprising:

a. a plurality of separately located microphones attached to the automobile for receiving sound from the sound source;

b. a processor for receiving electronic representations of the received sound from each of the plurality of microphones, and determining time differences of arrival of the received sound between each of the microphones, and determining the direction of the sound source from the time differences of arrival;

c. a display controllable by the processor to provide an indication of the direction of the sound source;

d. wherein determining the time differences of arrival comprises applying filtering to the electronic representation of the sound, computing the cross-correlation of the filtered signals and, e. determining the direction of the sound source comprises associating with the time differences of arrival between each pair of microphones a half-plane separating the pair, with boundary perpendicular to the direction connecting the pair, from which the sound originated and then localizing the sound source to a region of space relative to the automobile based on an intersection of half-planes.

17. The system of claim 16 wherein the processor monitors the ambient noise level and initiates determining of the direction of the sound source when the received sound substantially exceeds the ambient noise level.

18. The system of claim 16 wherein the type of sound is identified from one of a set of sounds and the type of sound is indicated on the display.

* * * * *